United States Patent [19]

Schloman, Jr. et al.

[11] Patent Number: 6,054,525
[45] Date of Patent: Apr. 25, 2000

[54] HYPOALLERGENIC NATURAL RUBBER LATEX AND A PROCESS FOR MAKING THE SAME

[75] Inventors: William W. Schloman, Jr., Stow; Donald McIntyre, Akron, both of Ohio

[73] Assignee: The University of Akron, Akron, Ohio

[21] Appl. No.: 08/714,222

[22] Filed: Sep. 16, 1996

[51] Int. Cl.$^7$ ....................................... C08K 3/04
[52] U.S. Cl. ................. 524/575.5; 524/925; 524/926
[58] Field of Search ................... 524/575.5, 925, 524/926

[56] References Cited

U.S. PATENT DOCUMENTS

| | | | |
|---|---|---|---|
| 2,475,141 | 7/1949 | Jones | 233/47 |
| 2,799,662 | 7/1957 | Ernst et al. | 260/29.7 |
| 3,215,649 | 11/1965 | Preiss et al. | 260/2.5 |
| 3,226,349 | 12/1965 | Cull | 260/29.6 |
| 3,503,917 | 3/1970 | Burke, Jr. | 260/29.6 |
| 4,623,713 | 11/1986 | Beinor et al. | 528/930 |
| 4,638,028 | 1/1987 | Lui et al. | 524/387 |
| 4,684,715 | 8/1987 | Kay et al. | 528/493 |
| 4,804,741 | 2/1989 | Verbiscar et al. | 528/931 |
| 5,272,771 | 12/1993 | Ansell et al. | 2/167 |
| 5,321,111 | 6/1994 | Ji | 528/1 |
| 5,336,712 | 8/1994 | Austgen, Jr. et al. | 524/530 |
| 5,407,715 | 4/1995 | Buddenhagen et al. | 428/35.7 |
| 5,545,451 | 8/1996 | Huang et al. | 428/36.8 |
| 5,580,942 | 12/1996 | Cornish | 528/1 |

FOREIGN PATENT DOCUMENTS 1366934  9/1974  United Kingdom.

OTHER PUBLICATIONS

"Characterization and Performance Testing of Guayule Latex" by Schloman, Jr. et al, *Rubber Chemistry and Technology*, vol. 69, pp. 215–222, presented at the Fall ACS Rubber Division Meeting (Cleveland), 8 pages, Oct. 17–20, 1995; revised Jan. 23, 1996.

"Absence of Cross–Reactivity of IgE Antibodies from Hevea Brasiliensis Latex Allergic Subjects with a New Source of Natural Rubber Latex from Guayule" by Siler et al., *Journal of Allergy & Clinical Immunology*, 14 pages (in press).

"Leap: Latex ELISA for Antigenic Proteins© Preliminary Report" by Beezhold, *The Guthrie Journal*, vol. 61/No. 2, pp. 77–81 (1992).

"Hypoallergenicity of Guayule Rubber Particle Proteins Compared to Hevea Latex Proteins" by Siler and Cornish, *Industrial Crops and Products 2*, pp. 307–313, (1994).

"Preparation of an Aqueous Dispersion of cis–1,4–polyisoprene" by Kostin et al., *Kauch. Rezina*, 29(12), pp. 9–11, 1970.

"Investigation of the Stabilizing Effect of Oleic Acid and Rosin in Polymer Dispersion" by Gustova et al., *Kolloiknyi Zhurnal*, vol. 33, No. 2, pp. 201–205, 1971.

"Preparation and Some Colloid–Chemical Properties of Aqueous SKI–3 Rubber Dispersions", by Khazanovich et al.,*Kolloidnyi Zhurnal*, vol. 33, No. 4, pp. 608–612, 1971.

"Particle Size Control in Emulsions of Hydrocarbon Soluble Polymers" by Falk et al.,*J. Appl. Polym. Sci.*, vol. 42(3), pp. 659–664, 1991.

*Primary Examiner*—Peter D. Mulcahy
*Attorney, Agent, or Firm*—Renner, Kenner, Greive, Bobak, Taylor & Weber

[57] ABSTRACT

A semi-synthetic rubber latex. The rubber employed in the latex is natural rubber obtained from plant life known to produce polyisoprene. Surprisingly, the semi-synthetic rubber latex is essentially devoid of those proteins that are known to give rise to natural rubber allergenicity or hypersensitivity, and are also essentially devoid of antigens that potentially will give rise to immune responses. Also provided is a method for obtaining the semi-synthetic rubber latex and dipped films thereof that are also substantially free of known natural rubber allergens.

19 Claims, 3 Drawing Sheets

HYPOALLERGENIC NATURAL RUBBER LATEX AND A PROCESS FOR MAKING THE SAME

This invention was made with government support under a cooperative agreement awarded by U.S. Department of Agriculture. The government may have certain rights to the invention.

TECHNICAL FIELD

The present invention is directed toward a rubber latex and vulcanized dipped films thereof. More particularly, the present invention is directed to semi-synthetic rubber latices that are derived from natural rubber and are hypoallergenic inasmuch as they are essentially free of antigens known to cause natural rubber allergenicity. The present invention is also directed toward a process for preparing the semi-synthetic latex of the present invention, as well as dipped formed goods thereof.

BACKGROUND OF THE INVENTION

Natural rubber obtained from plant life is the preferred source of cis-1,4-polyisoprene. Among the many advantages of natural rubber are its relatively inexpensive cost, its high wet gel strength, and its ability to rapidly cure.

Many of the products derived from natural rubber, especially dip-formed goods such as gloves, condoms, and tubing, typically come into contact with the user for extended periods of time. This contact is not only experienced through the skin, but is also experienced as a result of air-borne particles that enter the respiratory system. As a result of such exposure, many people have developed a hypersensitivity to natural rubber. This hypersensitivity includes Type I allergenicity, which affects approximately 6.5 percent of the U.S. population It is believed that natural rubber allergenicity results from the proteins and/or inorganic salts that are found within naturally occurring rubber latex. The proteins found within latex are both soluble and insoluble in aqueous mediums, and can be bound to the surface of the rubber particles or are associated with organelles. For example, the major source of natural rubber is the *Hevea brasiliensis* tropical tree which naturally produces rubber latex comprising globules of polyisoprene coated with proteins suspended in an aqueous dispersion. This dispersion comprises about 60 to about 75 percent water, about 25 to about 40 percent polyisoprene, about 1 to about 2 percent protein, and a balance of sugars and inorganic salts.

Another viable commercial source of natural rubber exists in the guayule shrub, which is native to North America. Like the Hevea rubber tree, the guayule shrub naturally produces cis-1,4-polyisoprene in a latex. Unlike Hevea, however, where access to the latex is achieved by merely tapping the tree, the latex within guayule is typically separated by crushing the entire plant because of the size of the plant and the position of the rubber within the plant.

Surprisingly, it has been recently found that the naturally occurring latex of the guayule bush does not elicit Hevea allergic responses. Thus, rubber allergenicity is believed to be species specific. In fact, recent analytical data confirms that many of the Hevea antigens believed to elicit Hevea allergenicity are not found in naturally occurring guayule latex. Accordingly, it is believed that Hevea latex allergy can be circumvented by using rubber from other species.

Nonetheless, it has recently been found, however, that latex obtained from guayule contains antigens that are capable of inducing immune responses distinct from those reactions with Hevea antigens. As a result, the proteins found within guayule latex must be considered potentially allergenic. It is hypothesized that naturally occurring latex from other plant life sources may also contain proteins that may elicit immune responses.

Thus, a need exists to develop a natural rubber latex that is essentially devoid of proteins that are known to elicit Hevea allergenic responses, or proteins found in guayule that are believed to elicit immune responses.

SUMMARY OF THE INVENTION

It is, therefore, a primary object of the present invention to provide a natural rubber latex that is hypoallergenic to the extent that the latex is essentially free of known Hevea antigens and essentially free of guayule antigens that potentially will elicit immune responses in individuals.

It is another object of the present invention to purify naturally obtained rubber and make a latex therefrom that is hypoallergenic to the extent that the latex in essentially devoid of known Hevea antigens and essentially devoid of guayule antigens that potentially will elicit immune responses in individuals.

It is yet another object of the present invention to provide a cured dipped film of a natural rubber latex wherein the natural rubber latex is hypoallergenic to the extent that the latex is essentially free of know Hevea antigens and essentially free of guayule antigens that potentially will elicit immune responses in individuals.

At least one of the foregoing objects of the present invention, together with the advantages thereof over existing rubber latexes and methods of purifying such latexes that shall become apparent from the specification that follows, are accomplished by the invention as hereinafter described and claimed.

In general, the present invention provides a hypoallergenic semi-synthetic latex comprising an aqueous dispersion of natural rubber that is essentially devoid of antigens that will give rise to immune responses.

The present invention also provides a process for the preparing of a semi-synthetic hypoallergenic latex comprising the steps of dissolving plant material containing polyisoprene in a single phase mixed solvent system, the mixed solvent system including a hydrocarbon solvent and an organic polar solvent, to form a miscella; raising the concentration of organic polar solvent to a desired level, thereby causing the precipitation of the natural polyisoprene from the miscella to form a swollen-rubber mass; dissolving the swollen-rubber mass in a hydrocarbon solvent to form a cement; emulsifying the cement with an aqueous solution under the agitation and high shear, and, stripping the hydrocarbon solvent to form a latex dispersion.

The present invention further provides a hypoallergenic vulcanized dipped film comprising a film of a cured natural rubber compounding solution, wherein the natural rubber compounding solution includes a semi-synthetic natural rubber latex, and wherein the film is essentially devoid of antigens that will give rise to immune responses.

PREFERRED EMBODIMENT FOR CARRYING OUT THE INVENTION

The present invention is directed toward a semi-synthetic hypoallergenic natural rubber latex. The hypoallergenic natural rubber latex of the present invention is semi-synthetic because the natural rubber is obtained from natural sources and placed in a latex synthetically. Among the plant materials that can be used as sources of natural rubbers are the Brazilian (Para) rubber tree (*Hevea brasiliensis*), guayule and its relatives (*Parthenium argentatum*, incanum, *stramonium var. tomentosum*, et al.), rubber plant (*Ficus elastica*), rabbitbrush (*Crysothamnus nauseosus*), Madagascar rubbervine (*Cryptostegia grandiflora*), milkweeds (*Asclepias syriaca*, speciosa, subulata et al.), goldenrods (*Solidago altissima*, graminifolia, rigida, et al.), pale Indian plantain (*Cacalia atriplicifolia*), Russian dandelion (*Taraxacum bicorne*), mountain mint (*Pycnanthemum incanum*), American germander (*Teucreum canadense*), tall beliflower (*Campanula americana*). Many other plants which produce natural rubber are known, particularly among the Asteraceae, Euphorbiaceae, Campanulaceae, Labiatae, and Moraceae families. It is to be understood that the rubbers from such plants including guayule fall under the general classification of natural rubbers and hence can be utilized either alone or in combination with each other. Hereinafter whenever reference is made to guayule, it is to be understood that the above-noted plants and shrubs can also be utilized, but because the natural rubber obtained from native guayule plants is preferred, the remainder of the specification will be directed thereto. It should be further understood that the term natural rubber or simply rubber as used herein refers to polyisoprene such as 1, 4-polyisoprene, obtained from plant life as discussed above, as well as any naturally occurring derivatives thereof found in such plant life.

The semi-synthetic latex is hypoallergenic because the latex is essentially devoid of antigens known to cause allergic reactions with Hevea sensitive individuals, and essentially devoid of guayule antigens that potentially will elicit immune responses. By essentially devoid of antigens known to cause allergic reactions with Hevea sensitive individuals, it is meant that, when the latex is subjected to standardized qualitative antigenic Hevea protein testing, there is qualitatively no indication of any chemical reaction that is indicative of the presence of known Hevea antigens. By essentially devoid of guayule antigens that potentially will elicit immune responses, it is meant that, when the latex is subjected to standardized qualitative testing designed to detect the presence of potential guayule antigens, there is qualitatively no indication of a chemical reaction that is indicative of the presence of potential guayule antigens. Hereinafter, for purposes of this disclosure, the term antigens will refer to protein antigens as found in plant life that produces natural rubber. It should be appreciated that there are numerous protein antigens found in each rubber producing plant and thus any reference made to Hevea or guayule antigens should not be viewed as limited to any specific protein antigen therein.

Furthermore, it is preferred that the semi-synthetic latex of the present invention contain less than about 2 mg of protein per gram of dry rubber, more preferably less than about 1.5 mg of protein per gram of dry rubber, and most preferably less than about 1.0 mg of protein per gram of dry rubber. The term protein, as used herein, refers to any protein indigenous to natural rubber producing plants. It should be appreciated that inasmuch as the semi-synthetic latex of the present invention is essentially free of Hevea and guayule antigens, and contains preferably less than the above specified protein levels, it is believed that the semi-synthetic latex of the present invention is also essentially free of potential antigens found in other plant life producing natural rubber.

As used herein, the term antigen will refer to those proteins or other matter within the plant that will give rise to allergenic responses. Without wishing to be bound by any particular theory, it is believed that allergic responses are caused by specific reactions between a foreign antigen and antibodies within the body.

The semi-synthetic latex of the present invention is an aqueous dispersion of natural rubber. The aqueous dispersion can include any desired concentration of rubber or include rubber globules of any desired size. The ultimate parameter, of course, being that the concentration and rubber particle size yield a stable dispersion. It is, however, preferred that the latex comprise greater than about 60% by weight, and more preferably greater than about 65% by weight, solids. The latex should preferably comprise greater than about 55% by weight, and more preferably greater than about 60% by weight, dry rubber content. Furthermore, the latex should preferably have a coagulum content of less than about 0.05%. The mechanical stability of the latex is preferably greater than about 650 seconds. Regarding the particle size of the rubber globules that comprise the semi-synthetic latex of the present invention, it is preferred that the latex derived from the natural rubber of Hevea have a particle size between about 0.6 and about 1.05 $\mu$m, and more preferably between about 0.7 and 0.85 $\mu$m. When the latex is derived from natural rubber of guayule, it is preferred that the particle size range from about 0.1 to about 8 $\mu$m, and more preferably between about 0.35 and about 0.5 $\mu$m.

From the semi-synthetic latex of the present invention, vulcanized rubber films are prepared. It should be appreciated that any conventional method of achieving a vulcanized film can be employed. A typical latex compound may include surface active agents for uniform mixing of water-immiscible ingredients, liquid phase modifiers either to prevent premature coagulation during compounding or to provide a controlled rate of gel formation, as well as polymer phase modifiers to impart desired physical properties to the cured compound.

Surface active agents include dispersing and wetting agents for the dispersal of solids such as Darvan® WAQ and Darvan® SMO, as well as emulsifying agents such as Darvan® WAQ for the dispersal of liquids. Products sold under the name Darvan® are commercially available from RTV, of N-Ct. Liquid phase modifiers include stabilizers such as potassium hydroxide and ammonia to control pH and surfactants to maintain colloidal properties; thickeners such as ammonium alginate and methyl cellulose to give desirable flow characteristics; wetting agents such as Surfynol® TG, which is commercially available from Air Products and Chemicals, Inc. of Allentown, Pennsylvania, to facilitate film formation and fiber impregnation; coagulants such as calcium nitrate and ethanol to initiate coalescence of polymer particles; gelling agents such as sodium silicofluoride to destabilize latex and form a continuous solid phase; defoamers such as Surfynol® DF-37, also available from Air Products and Chemicals, Inc., to control foaming; and heat sensitizers such as ammonium persulfate and poly(vinyl methyl ether) to permit gelation at elevated temperatures. The polymer phase modifiers include vulcanizing agents such as sulfur to form cross-links between polymer chains; cure activators such as zinc oxide to promote cross-link formation, accelerators such Butyl Namate®, commercially available from RTV and Setsit® 104, commercially available from RTV to control the rate vulcanization; anti-degradants such as Wingstay®100, commercially available from The Goodyear Tire and Rubber Company of Akron, Ohio, Naugawhite®, commercially available from Uniroyal Chemical Company of Naugatuck, Connecticut, and AgeRite® Superlite®, available from RTV to impart age resistance; fillers such as clays, carbon blacks, and colloidal silicas and talcs to modify tensile, abrasion, and tear properties; dyes and pigments; and softeners such as mineral oil to control modulus.

Once the compounding recipe, as generally described above, has been prepared and allowed to prevulcanize, dipped films can be easily formed as commonly known in the art. A more detailed description of the process for obtaining a vulcanized dipped film from the semi-synthetic latex of the present invention is set forth in Examples 13–16 below.

As with the semi-synthetic latex of the present invention, the cured or vulcanized dipped film goods prepared therefrom are essentially devoid of antigens known to cause allergic reactions with Hevea sensitive individuals and essentially devoid of guayule antigens that potentially will elicit immune responses. By essentially devoid of antigens known to cause allergic reactions with Hevea sensitive individuals, it is meant that, when the cured dipped film is subjected to standardized qualitative antigenic Hevea protein testing, there is qualitatively no indication of any chemical reaction that is indicative of the presence of known Hevea antigens. By essentially devoid of guayule antigens that potentially will to elicit immune responses, it is meant that, when the cured dipped film is subjected to standardized qualitative testing designed to detect the presence of potential guayule antigens, there is qualitatively no indication of a chemical reaction that is indicative of the presence of potential guayule antigens. It should be appreciated that inasmuch as the cured dipped films of the present invention are essentially free of Hevea and guayule antigens and contain less than the above specified protein levels, it is believed that the cured dipped films of the present invention are also essentially free of potential antigens found in other plant life producing natural rubber.

Further, the dipped film goods of the present invention are surprisingly low in total protein content. Accordingly, it is preferred that the dipped films of the present invention contain less than about contain less than about 20 $\mu$g of protein per gram of dry rubber, more preferably less than about 15 $\mu$g of protein per gram of dry rubber, and most preferably less than about 12 $\mu$g of protein per gram of dry rubber.

The present invention also provides a process for the formation of the semi-synthetic hypoallergenic natural rubber latex that is described above. The process typically begins with the removal of the naturally occurring latex form its source. Removal of the naturally occurring latex from the above-described rubber-producing plants often requires a variety of techniques based on the nature of the plant. Where the latex cannot simply be tapped from a rubber producing tree as is commonly practiced when obtaining rubber from Hevea, initial extraction generally involves crushing the plant to rupture the cells holding the natural rubber. For example, when the guayule shrub is employed, the entire plant can be passed through shredding, grinding, cutting, crushing, and the like, to obtain small pieces of material of less than an inch. A suitable crushing and shredding device can be a conventional hammermill of one or more stages, optionally followed by a roll mill in a subsequent stage.

Once the naturally occurring latex has been obtained, or the entire plant crushed to a sufficient size, the naturally occurring latex is extracted using a solvent system containing one or more solvents. Single solvent systems include hexane, toluene, or tetrahydrofuran. In the present invention, it is preferred to use a multi-solvent system comprising one or more organic polar solvents and one or more hydrocarbon solvents. Although the solvents can form a two-phase system, they preferably form a single-phase system. The multi-solvent system can be premixed and added to the latex or separately, but simultaneously, added to the natural rubber latex.

When the solvent extraction system utilizes two types of solvents, the amount of organic polar solvent utilized generally includes from about 10 percent to about 35 percent by weight of the total solvent system, and preferably from about 15 percent to about 27 percent by weight of the total solvent system. Examples of organic polar solvents include ketones having from about 3 to about 8 carbon atoms such as acetone, methyl ethyl ketone and the like, with acetone being preferred; esters having from about 3 to about 8 carbon atoms, such as the formates, acetates, propionate and the like; alcohols having from about 1 to about 8 carbon atoms such as methanol, ethanol, isopropanol and the like; and ethers having from about 2 to about 8 carbon atoms such as dimethyl ether, diethyl ether and the like, as well as cyclic ethers of from about 4 to about 8 carbon atoms such as tetrahydrofuran and the like.

The hydrocarbon solvents include alkanes having from about 4 to about 9 carbon atoms such as pentane, hexane, heptane and the like, with pentane and hexane being preferred; cycloalkanes and alkylcycloalkanes having from about 5 to about 10 carbon atoms such as cyclopentane and cyclohexane; and aromatics and alkylaromatics having from about 6 to about 12 carbon atoms such as benzene, toluene, xylene and the like.

Accordingly, numerous combinations of an organic polar solvent and a hydrocarbon can exist. A preferred extraction solvent system is an azeotropic composition containing about 20 percent by weight acetone and about 80 percent by weight pentane. Another preferred solvent extraction system is an azeotropic composition containing about 6 percent by weight isopropanol and about 94 percent by weight pentane.

Following the addition of the solvent system, the resulting solution typically contains the extracted natural rubber as well as various non-rubber substances commonly called resin which may include sundry plant material, inorganics, and proteins. This solution is commonly called the miscella. A portion of the extracted natural rubber is subsequently recovered from the miscella and separated from the major proportion of the resin by the addition of an organic polar solvent, most commonly the organic polar solvent component used in the extraction step. Alternatively, the miscella can be added to the organic polar solvent. The amount of polar organic solvent will depend on the choice of solvents. A desirable initial ratio of organic polar solvent to hydrocarbon solvent is one that results in the onset of the precipitation of high bulk viscosity natural rubber from the miscella. As the addition of organic polar solvent continues, the natural rubber precipitating is of a gradually lower bulk viscosity. By controlling the final ratio of polar organic solvent and hydrocarbon solvent, the bulk viscosity of the precipitated natural rubber can be adjusted. Generally, natural rubber having a high bulk viscosity is desirable, typically from about 20 to about 200 Mooney units, desirably from about 40 to about 150 Mooney units, and preferably from about 60 to about 120 Mooney units.

The precipitated natural rubber is isolated in the form of a solvent-swollen mass, which contains from about 20 to about 60 percent by weight natural rubber and from about 40 to about 80 percent by weight solvent. The composition of the solvent component of the swollen natural rubber will depend on the choice of solvents used in the extraction and precipitation steps. A typical swollen natural rubber consists of about 10 to about 50 percent by weight of rubber, about 24 to about 43 percent by weight of pentane, and about 26 to about 47 percent by weight of acetone.

The above-described solvent-swollen mass is dissolved in a hydrocarbon solvent to yield a cement. The cement comprises about 45 percent by weight natural rubber dissolved in one or more hydrocarbon solvents. The hydrocarbon solvents that may be employed include alkanes having from about 4 to about 9 carbon atoms such as pentane, hexane, heptane, and the like, with pentane and hexane being preferred; cycloalkanes and alkylcycloalkanes having from about 5 to about 10 carbon atoms such as cyclopentane and cyclohexane; and aromatics and alkylaromatics having from about 6 to about 12 carbon atoms such as benzene, toluene, xylene, and the like. Preferably, the hydrocarbon solvents are those used to extract the natural rubber from the plant material. The amounts of hydrocarbon solvents will depend on the choice of solvents and the composition of the swollen natural rubber.

Alternatively, the solvent-swollen mass can be desolventized, that is the solvent can be removed, resulting in a solid mass of natural rubber. This mass of natural rubber, or bail of rubber as it is referred to, is then dissolved in one or more hydrocarbon solvents to yield a cement. In either situation, the desired composition of the cement will depend on the bulk viscosity of the natural rubber, the choice of solvents used to prepare the cement, and the choice of agitator used in the subsequent dispersion step. A typical cement consists of about 6 to about 21 percent by weight natural rubber, about 6 to about 10 percent by weight of acetone, and about 69 to about 88 percent by weight pentane.

The natural rubber cement is then dispersed into a water solution to form an emulsion. Prior to dispersing the cement into a water solution, suitable antidegradants can be added to the cement to stabilize the natural rubber contained therein. Examples of such antidegradants include hindered phenols such as Wingstay® L produced by the Goodyear Chemical Company of Akron, Ohio, AgeRite® Superlite® produced by the R. T. Vanderbilt Company of Norwalk, Connecticut, and Santowhite Powder® produced by the Monsanto Company of St. Louis, Mo.; aromatic amines such as Santoflex® 13 produced by the Monsanto Company; Wingstay® 100 produced by the Goodyear Chemical Company, and AgeRite® Stalite® produced by R. T. Vanderbilt Company; dihydroquinolines such as AgeRite® Resin D produced by R. T. Vanderbilt Company, and Flectol® H produced by Monsanto Company; and phosphates such as Vanos® 13 and AgeRite® Geltrol produced by R. T. Vanderbilt Company. Alternatively, aqueous dispersions of suitable antidegradants such as AgeRite® Superlite® Emulsion produced by R. T. Vanderbilt Company can be added after dispersing the cement in the aqueous solution.

The cement is most commonly emulsified in an aqueous phase containing from about 0.1 to about 25 percent by weight based on total natural rubber of at least one surfactant. The amount of surfactant depends in part on the solids content of the cement, the ratio of cement to aqueous phase, the method used to concentrate the desolventized emulsion, and the characteristics of the surfactant. Such surfactants are employed to reduce interfacial tension and stabilize the emulsion. A typical aqueous phase contains about 0.1 to about 20 percent by weight based on total natural rubber, desirably about 0.2 to about 15 by weight based on total natural rubber, and preferably about 0.2 to about 10 percent by weight based on total natural rubber of surfactant.

The emulsion of the present invention can be prepared by bringing the cement and aqueous phase into contact under conditions of agitation with high shear. Suitable emulsification equipment includes colloid mills, sonication probes, homogenizers, liquid whistles, and high-shear mixers. It is preferred, although not necessary, that the cement be emulsified by adding the cement slowly to a known volume of aqueous phase-containing surfactant that is agitated using a suitable emulsification device. It is also preferred to employ at least one anionic surfactant because anionic surfactants are more effective emulsifiers for rubber cements than cationic or nonionic surfactants.

Effective anionic surfactants include the alkali metal salts of fatty acids such as sodium stearate, sodium palmitate, potassium oleate, and the like; the alkali metal salts of fatty acid sulfates such as sodium lauryl sulfate and the like; the alkali metal salts of alkylbenzenesulfones and alkylnaphthalenesulfones such as sodium dodecylbenzenesulfonate, sodium alkyinaphthalene-sulfonate, and the like; the alkali metal salts of dialkyl-sulfosuccinates and the like such as Emcol® 4500 by Witco Chemical Company of New York, N.Y.; the alkali metal salts of sulfated alkylphenol ethoxylates such as sodium octylphenoxypolyethoxyethyl sulfate produced as Triton® X-301 by Union Carbide Corporation of New York, N.Y.; the alkali metal salts of polyethoxyalcohol sulfates such as the Alipal® CO-series produced by Rhône-Poulenc of C-NJ; and the alkali metal salts of polyethoxyalkylphenol sulfates such as the Alipal® CO-series produced by Rhône-Poulenc. Mixtures of the above anionic surfactants can also be employed.

Alternatively, the anionic surfactant may be formed in the course of emulsification by adding to the cement fatty acids such as stearic acid, palmitic acid, oleic acid, tall oil acids and the like; or alkylbenzenesulfonic acid and alkylnaphthalenesulfonic acids such as dodecyclbenzenesulfonic acid and the like. Sufficient alkali metal hydroxide, such as sodium hydroxide or potassium hydroxide, is then added to the aqueous phase to effect neutralization of the acidic components of the cement upon mixing of the aqueous phase and cement. It is preferred to employ a minimum surfactant level, yet one that is consistent with maintaining a stable emulsion, in order to reduce and control foaming during subsequent solvent stripping. The ratio of the cement and aqueous phase that is mixed during emulsification can be varied considerably depending on the cement viscosity and surfactant system being employed. A cement to aqueous phase ratio of about 2:1 to about 1:1 is preferred. The amount of water contained in the emulsion is not critical so long as there is sufficient water present to produce a stable emulsion. The amount of the fatty acids to be added should be consistent with the amount of total surfactant previously recommended. Those skilled in the art, without undue experimentation, will then be able to determine the amount of base to be added to effectively neutralized the acid.

After formation of the emulsion is complete, the cement solvent is removed by stripping, flashing, or distillation. The desolventization operation is conveniently carried out under vacuum at ambient pressure or at elevated temperature. The conditions chosen for the desolventization operation can be varied considerably depending on the composition of the cement solvent and the level and foaming characteristics of the surfactant.

The latices produced by this procedure contained between about 10 and 60 percent by weight solids. These products may be diluted to as low a concentration as may be desired or they may be concentrated further by removal of water through centrifugation. Alternatively, a stabilizing or creaming agent such as ammonium alginate, produced as Superloid® by Kelco San Diego, Calif., or methylcellulose, produced by Methocel® A4M by the Dow Chemical Company of Midland, Mich., may be added. The mixture is then allowed to stand for a period of time and separate into two layers, an upper layer containing substantially all of the rubber and a lower layer essentially free of rubber.

The process for the formation of a semi-synthetic latex according to the present invention is explained in greater detail in the following Examples. The Examples set forth hereinbelow are to be understood as not limiting the disclosure, the claims serving to define the scope of the invention.

EXAMPLE 1

Ground guayule shrub was charged to a Soxhlet-type apparatus and exhaustively extracted with a mixture of about 20 percent by weight of acetone and about 80 percent by weight of pentane. To the extract solution was added sufficient acetone to adjust the acetone-pentane ratio to about 52 parts by weight to about 48 parts by weight. As the acetone was added, natural rubber separated from the solution as a solvent-swollen mass containing about 35 parts by weight of dry rubber.

EXAMPLE 2

A sample of latex having a dry rubber content of about 36 percent was isolated from ground guayule shrub. A guayule shrub was passed through a hammermill with a 6.5-mm screen in an aqueous medium, the solution having a density of about 1 part by weight to 5 parts by volume and containing about 0.1% by weight sodium sulfite and about 1% by weight polyvinylpolypyrrolidone, then filtered. Sufficient aqueous ammonia was added to the resulting homogenate to provide an ammonia content of about 0.2% by weight. Preliminary clarification was obtained with a single pass through a Westphalia Model KA 05-00-105 centrifuge fitted with a chamber-type bowl. Final purification was carried out using the centrifuge with three cycles of separation, subsequent 5-fold dilution of the light phase with about 0.2% by weight aqueous ammonia, and respiration. The purified latex was diluted with about 0.1% by weight ammonium alginate in a volumetric ratio of about 1 to about 2.5, respectively, in a polyethylene tank. After phase separation was complete, the lower, non-latex phase was drained from the tank and the latex phase rediluted as before. Two more cycles were carried out using about 0.05% by weight ammonium alginate. The final product (40% dry rubber content) was transferred to polyethylene bottles and stored at about 4° C. until use.

EXAMPLE 3

A rubber cement was made containing about 1,267 parts by weight of pentane, about 1 part by weight of AgeRite® Superlite®, and about 286 parts by weight of swollen guayule rubber, which consisted of about 100 parts by weight of guayule rubber (dry weight), about 97 parts by weight of acetone, and about 89 parts weight of pentane. The cement was added to an aqueous solution containing about 9 parts by weight of sodium lauryl sulfate and about 847 parts by weight of water. In the course of addition, the water-cement mixture was subject to agitation with a PowerGen® homogenizer, made by Fischer Scientific, Inc. of Pittsburgh, Pa. operated from about 7,500 rpm to about 10,000 rpm to produce a cement-in-water emulsion. Organic solvents were evaporated from the emulsion in a rotary evaporator operating at about 25° C. under about 27 kPa pressure. The desolventization produced after filtration through a 60-mesh filter cloth about 935 parts by weight of a dilute latex which was concentrated by mixing with about 93 parts by weight of an aqueous solution containing about 1 percent by weight of ammonium alginate. On standing, the latex-ammonium alginate mixture separated into two layers. The lower layer containing essentially no rubber was drawn off and replaced by about 204 parts by weight of water. The latex and water were then mixed. On standing, the mixture separated into two layers. The lower layer was drawn off. After filtration of the upper latex layer through a 60-mesh filter cloth, about 221 parts by weight of latex were obtained having a dry rubber content of about 35 percent by weight.

EXAMPLE 4

Following the procedure in Example 3, a rubber cement containing about 817 parts by weight of pentane, about 1 part by weight of AgeRite® Superlite®, about 100 parts by weight of acetone, and about 100 parts by weight of dry guayule rubber was mixed with an aqueous solution containing about 6 parts by weight of potassium oleate with about 640 parts by weight of water to form an emulsion. Organic solvents were evaporated from the emulsion in a rotary evaporator operating at about 25° C. under 27 kPa pressure. The desolventization produced after filtration through a 60-mesh filter cloth about 718 parts by weight of a dilute latex which was concentrated by mixing with about 33 parts by weight of an aqueous solution containing about 1 percent by weight of ammonium alginate. On standing, the latex-ammonium alginate mixture separated into two layers. The lower layer, which essentially contained no rubber was drawn off and replaced by about 570 parts by weight of an aqueous solution containing about 0.05 percent by weight of ammonium alginate. The latex and dilute alginate solution were then mixed. On standing, the mixture separated into two layers. The lower layer was drawn off. After filtration of the upper latex layer through a 60-mesh filter cloth, about 182 parts by weight of latex were obtained having a dry rubber content of about 43 percent by weight.

EXAMPLE 5

A rubber cement was made containing about 1254 parts by weight pentane, about 1 part by weight AgeRite® Superlite®, and about 283 parts by weight swollen guayule rubber, the swollen rubber consisting of about 100 parts by weight guayule rubber (dry weight), about 97 parts by weight acetone per hundred parts guayule rubber, and about 89 parts by weight pentane per hundred parts guayule rubber. Following the procedure in Example 3, the cement was mixed with an aqueous solution containing about 42 parts by weight Triton X-301 (20% solids by weight) and about 808 parts by weight water to form an emulsion. Organic solvents were evaporated from the emulsion in a rotary evaporator operating at about 25° C. under about 27 kPa pressure. Evaporation produced after filtration through a 60-mesh filter cloth about 998 parts by weight of a dilute latex which was concentrated by mixing with about 96 parts by weight of an aqueous solution containing about 1% by weight of ammonium alginate. On standing, the mixture separated into two layers. The lower layer, which essentially contained no rubber, was drawn off and replaced by about 798 parts by weight water. The latex and water were then mixed. On standing, the mixture separated into two layers The lower layer was drawn off. After filtration of the upper latex layer through a 60-mesh filter cloth, about 189 parts by weight of latex were obtained having a dry rubber content of about 43 percent by weight.

EXAMPLE 6

A rubber cement was made containing about 1254 parts by weight pentane, about 1 part by weight AgeRite® Superlite®, about 8 parts by weight lecithin, and about 283 parts by weight swollen guayule rubber, the swollen rubber consisting of about 100 parts by weight of guayule rubber (dry weight), about 97 parts by weight acetone per hundred parts guayule rubber, and about 89 parts by weight pentane per hundred parts guayule rubber. Following the procedure in Example 3, the cement was mixed with an aqueous solution containing about 3 parts by weight potassium oleate and about 820 parts by weight water to form an emulsion. Organic solvents were evaporated from the emulsion in a rotary evaporator operating at about 25° C. under about 27 kPa pressure. Evaporation produced after filtration through a 60-mesh filter cloth about 926 parts by weight of a dilute latex which was concentrated by mixing with about 90 parts by weight of an aqueous solution containing about 1% by weight of ammonium alginate. On standing, the mixture separated into two layers. The lower layer, which essentially contained no rubber, was drawn off and replaced by about 195 parts by weight water. The latex and water were then mixed. On standing, the mixture separated into two layers. The lower layer was drawn off. After filtration of the upper latex layer through a 60-mesh filter cloth, about 308 parts by weight of latex were obtained having a dry rubber content of about 26% by weight.

EXAMPLE 7

Following the procedure in Example 3, a rubber cement containing about 684 parts by weight pentane, about 3.1 parts by weight oleic acid, about 1 part by weight AgeRite® Superlite®, and about 278 parts by weight swollen guayule rubber, the swollen rubber consisting of about 100 parts by weight of guayule rubber (dry weight), about 97 parts by weight acetone per hundred parts by weight guayule rubber, and about 89 parts by weight pentane per hundred parts guayule rubber, was mixed with an aqueous solution containing about 1.1 parts by weight potassium hydroxide and about 543 parts by weight water to form an emulsion. Organic solvents were evaporated from the emulsion in a rotary evaporator operating at about 25° C. under about 27 kPa pressure. Evaporation produced after filtration through a 60-mesh filter cloth about 1167 parts by weight of a dilute latex which was concentrated by mixing with about 60 parts about of an aqueous solution containing 1% by weight of ammonium alginate. Additional organic solvents were removed from the dilute latex by distillation at about 30° C. to about 39° C. to produce about 802 parts by weight of desolventized latex-ammonium alginate mixture. On standing, the mixture separated into two layers. The lower layer containing essentially no rubber was drawn off and replaced by about 217 parts by weight of water. The latex and water were then mixed. On standing, the mixture separated into two layers. The lower layer was drawn off. After filtration of the upper latex layer through a 60-mesh filter cloth, about 331 parts by weight of latex were obtained having a dry rubber content of about 27%. It should be appreciated that Examples 3, 4, 5, and 6 set forth procedures for preparing natural rubber latices using pre-formed surfactants, and that Example 7 sets forth a procedure for preparing natural rubber latices with the simultaneous in situ formation of anionic surfactant.

EXAMPLE 8

The protein concentration in Hevea latex was determined as follows. Ammonified latex, obtained from Guthrie Latex, Inc. of Phoenix, Ariz., was poured onto a plastic plate and the emulsion allowed to collapse and air dry for 18 hours. The resulting latex film was cut into small pieces (1cm$^2$) and placed in a polypropylene bottle. Soluble proteins were recovered from the latex pieces by extracting them overnight (37° C.) in distilled water The latex pieces were removed and the extract centrifuged at 1000×g to remove particulate matter and then dialyzed against phosphate buffered saline (PBS). Protein concentration of the extracts was determined by the bicinchonininc acid (BCA) method, which is a routine laboratory assay for the determination of protein concentration. The Micro BCA protein Assay Kit, sold by Pierce Chemical Co., of Rockford, Ill. was employed.

EXAMPLE 9

The protein concentration in the latex products of Example 2 was determined as follows. The proteins in the latex were solubilized by incubating with 10% Triton® X-100 for 1 hour. Interfering substances were removed by precipitation of the proteins with trichloracetic acid (TCA) and deoxycholate (DOC). Protein concentration was determined, as in Example 8, by the bicinchoninc acid (BCA) method.

EXAMPLE 10

The protein concentration in the latex products of Example 3 was determined by solubilizing the proteins as in Example 9.

EXAMPLE 11

The protein concentration in the latex products of Example 4 was determined by solubilizing the proteins as in Example 9.

EXAMPLE 12

The protein concentration in the latex products of Example 7 was determined by solubilizing the proteins as in Example 9.

It should be appreciated that Example 8 represents the protein content of latices isolated from Hevea, Example 9 represents the protein content of isolated guayule latices purified using known techniques, and that Examples 10–12 represent the protein content of the semi-synthetic latex of the present invention. Table I sets forth the results of the protein content tests. It should further be appreciated that the protein content of the semi-synthetic latex of the present invention is substantially lower than that of the Hevea latices and that of guayule latices.

TABLE I

| Example No. | Latex Product of Example No. | Protein Level, mg/g dry rubber |
|---|---|---|
| 8 | — | 11.8 |
| 9 | 2 | 2.3 |
| 10 | 3 | 0.91 |
| 11 | 4 | 1.1 |
| 12 | 7 | 1.0 |

Next, the protein content of the latices of Examples 8–12 was analyzed for known Hevea antigen content. This analysis was performed using the Guthrie LEAP Latex ELISA (enzyme-linked immunosorbent assay) for Antigenic Proteins as sold by the Guthrie Research Institute of Sayre, Pa. This assay generally measures protein content based on protein reaction with antibodies that were induced by the introduction of Hevea proteins into laboratory animals; in other words, the assay measures specific antigen-antibody reactions.

Specifically, the LEAP assay is based on an antiserum from rabbits immunized against proteins extracted from films of ammoniated latex. The assay was performed as described by the manufacturer with slight modification. All incubations were done at 37° C. Protein samples from latex and cured dipped films thereof were serially diluted with about 0.1 M sodium carbonate, at about pH 9.6, and bound to wells of polystyrene microtiter plates (Corning) by incubating the plates for about 4 hours.

Control wells were coated with dilutions of protein from latex film extracts (latex protein standard). Wells were rinsed once with a wash buffer consisting of PBS containing about 0.1% Tween® 20, and blocked for about 1 hour in about 5% by weight bovine serum albumin in PBS. Tween® is sold by ICI Americas, Inc. of Memphis, Tenn. Wells were rinsed three times with wash buffer, and incubated overnight with rabbit antiserum raised against proteins extracted from films of ammoniated Hevea latex by three rinses with wash buffer and a about 2 hours incubation in anti-rabbit IgG conjugated to the enzyme alkaline phosphatase (AP).

After a final rinse (five times with wash buffer), AP substrates were added and color development was allowed to proceed for 20 min. The reaction was stopped by the addition of 4 N sulfuric acid, and the absorbance read at 405 nm using a microplate reader (Bio-Tek Instruments, Inc.). Color development is proportional to the amount of AP present, and thus to the amount of bound antibody. This is a measure of the amount of antigen present in the samples. The microtiter plates, the rabbit anti-latex protein antiserum, the AP-anti-rabbit IgG conjugate, the control latex protein, and the AP substrates were provided with the LEAP assay kit.

Figure 1:
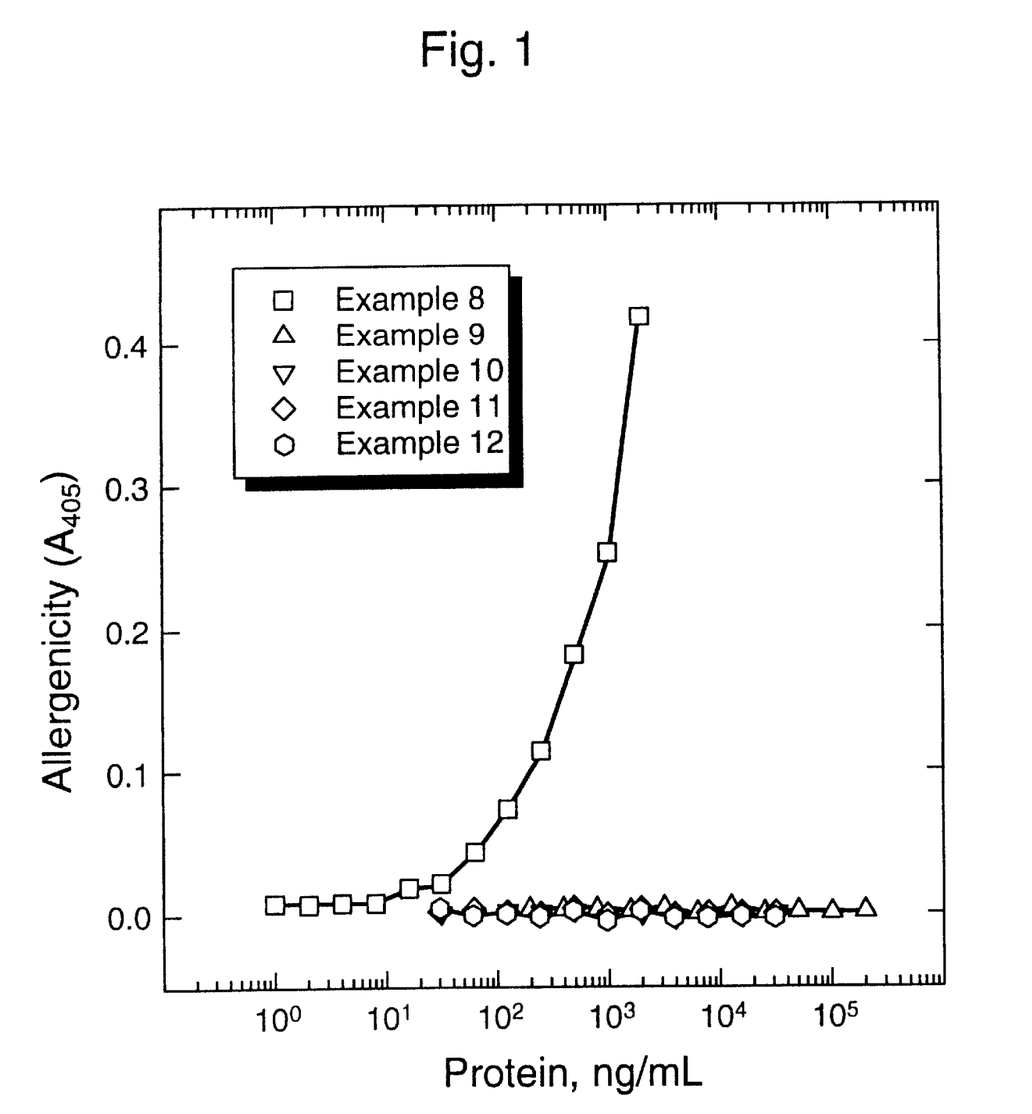

FIG. 1 illustrates the enzyme-linked immunosorbent assay (ELISA) of solubilized latex proteins determined using the rabbit anti-Hevea glove protein polyclonal antibodies as set forth above. Color development is proportional to the amount of antibody bound to any protein allergen. These assays illustrate that proteins isolated from the products of this invention (Examples 10–12) do not include allergens of the types found in *Hevea bristliness* latex (Example 8). It should be appreciated that while the assay employed is designed to measure the amount of antigen in a given sample, and is therefore quantitative, the assay served merely as a qualitative analyses inasmuch as no reading other than noise was detected for Examples 9–12. In other words, no color development was detected indicating that there was no detectable level of antigen-antibody reaction.

Next, the protein content of Examples 9–12 was analyzed for potential guayule antigens, These potential guayule antigens are those proteins that are indigenous to guayule plants and that have been identified, through accepted laboratory testing, as proteins likely to give rise to an immunogenic response in humans.

This analysis consisted of an assay test similar to that employed in the Guthrie LEAP Latex ELISA employed above, except that the antibodies employed were murine anti-guayule protein polyclonal antibodies prepared by injecting female Swiss Webster mice with guayule rubber particle suspensions. The assays were likewise run by incubating allergen-bound antibodies with anti-mouse immunoglobin G conjugated to alkaline phosphatase (AP). Similarly, color development was measured at 405 nm.

Figure 2:
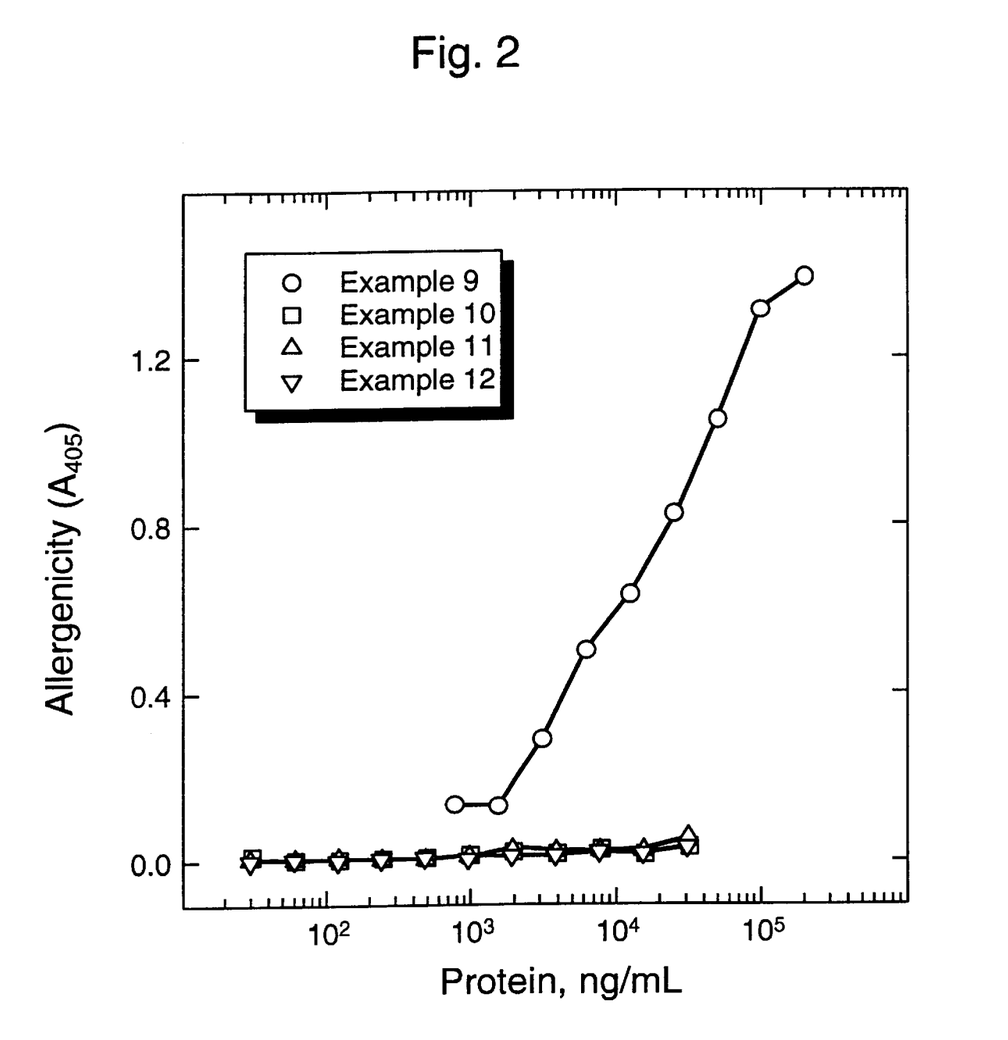

FIG. 2 illustrates the ELISA of solubilized latex proteins determined using murine anti-guayule protein polyclonal antibodies as set forth above. These assays illustrate that proteins isolated from the products of this invention (Examples 10–12) do not include allergens of the types found in latex isolated from the guayule shrub (Example 9).

Unexpectedly, the proteins solubilized from the products of this invention (Examples 10–12) contained neither the allergenic proteins found in *Hevea brasiliensis* (Example 8) nor the allergenic proteins found in latex isolated from guayule shrub (Example 9).

The following examples illustrate that this hypoallergenicity was also observed when the latices in the above examples were used in the preparation of vulcanized rubber films. The compounding recipe employed to form the vulcanized dipped films of the following examples is set forth in Table II. It should be appreciated that many other conventional or commercial recipes can also be utilized.

TABLE II

| | Ingredients | Weight, parts | |
| | | Dry | Wet |
| --- | --- | --- | --- |
| 1 | Latex | 100. | 250.0 |
| 2 | 10% KOH | 0.5 | 5.0 |
| 3 | 33% Surfactant[a] | 2.0 | 6.0 |
| 4 | 68% Sulfur dispersion | 0.8 | 1.18 |
| 5 | 60% Zinc oxide dispersion | 0.75 | 1.25 |
| 6 | Dithiocarbamate solution[b] | | 2.25 |
| 7 | Water | | 4.5 |
| 8 | 65% Antioxidant emulsion[c] | 1.0 | 1.54 |

[a]1:1 Darvan ® SMO + Darvan ® WAQ.
[b]Setsit 104.
[c]AgeRite ® Superlite ®.

EXAMPLE 13

A dipping compound prepared utilizing the product of Example 2 was prevulcanized at about 65° C. for about 2 hours. The mixture was cooled to ambient temperature after prevulcanization was complete. A glass form, previously coated with calcium nitrate coagulant, was immersed in the prevulcanized dipping compound for about 20 seconds, then withdrawn. The latex film obtained in this manner was leached first for about 2 minutes in a water bath maintained at about 600° C., then for about 2 minutes in a water bath maintained at about 70° C. The leached film was then dried for about 20 minutes in a forced-air oven maintained at about 104° C. The exposed surface of the dried film was brushed with absorbable dusting powder approved by United States Pharmacopoeia, then removed from the glass form.

EXAMPLE 14

Following the procedure in Example 13, a vulcanized dipped film was prepared utilizing the product of Example 3.

EXAMPLE 15

Following the procedure in Example 13, a vulcanized dipped film was prepared utilizing the product of Example 4.

EXAMPLE 16

Following the procedure in Example 13, a vulcanized dipped film was prepared utilizing the product of Example 7.

EXAMPLE 17

The protein concentration in the vulcanized dipped film prepared in Example 13 was determined as follows. The proteins in the film were solubilized by incubating with 10% Triton® X-100 for about 1 hour. Interfering substances were removed by precipitation of the proteins with TCA and DOC. Protein concentration was determined, as in Example 8, by BCA method.

EXAMPLE 18

The protein concentration in the vulcanized dipped film prepared in Example 14 was determined in accordance with the procedure set forth in Examples 17.

EXAMPLE 19

The protein concentration in the vulcanized dipped film prepared in Example 15 was determined in accordance with the procedure set forth in Examples 17.

EXAMPLE 20

The protein concentration in the vulcanized dipped film prepared in Example 16 was determined in accordance with the procedure set forth in Examples 17.

Table III sets forth the results of the protein content tests. It should be appreciated that the protein content of a vulcanized dipped film prepared from the latex isolated from guayule shrub (Example 17) is substantially higher than those of the vulcanized dipped films prepared from the products of this invention (Examples 18–20).

TABLE III

| Example No. | Dipped Film Example No. | Protein Level μg/g dry rubber |
|---|---|---|
| 17 | 13 | 129 |
| 18 | 14 | 20 |
| 19 | 15 | 12 |
| 20 | 16 | 11 |

The protein content of the vulcanized dipped films of Examples 17–20 was analyzed for potential guayule antigens. The same assay employed above to determine the potential guayule antigen content of Examples 9–12 was employed using murine anti-guayule protein polyclonal antibodies prepared by injecting female Swiss Webster mice with purified guayule rubber particle suspensions.

Figure 3:
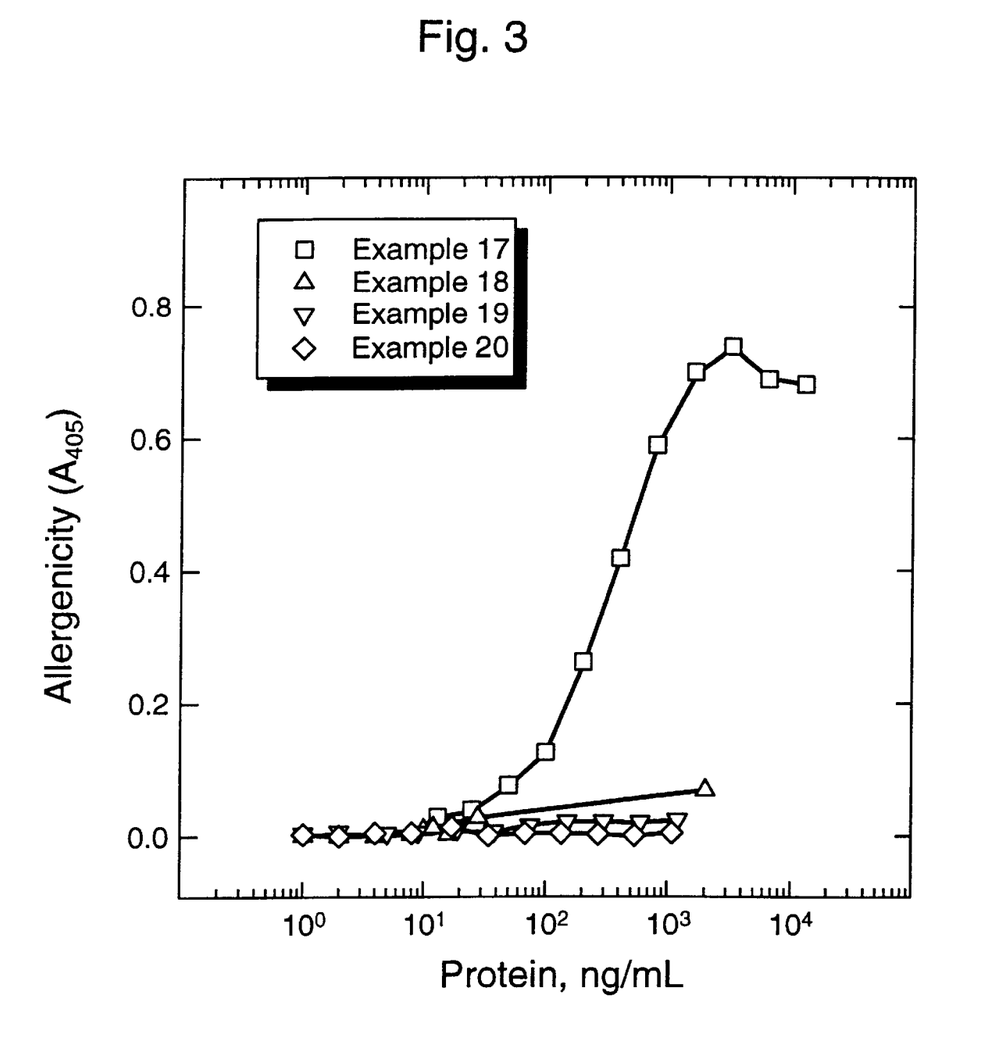

FIG. 3 displays the assay results. As can be seen, the cured film prepared from the latices of Example 3, as formed in Example 14 and solubilized in Example 17 gave rise to detectible antigen-antibody reactions. No antigen antibody reaction was detected, for qualitative purposes, using the films of Examples 18–20. Thus, the cured dipped films of Examples 18–20, which are indicative of the cured dipped films of the present invention, our essentially free of guayule antigens that potentially will elicit immune responses.

The latices obtained in accordance with this invention are suitable for use in the preparation of foam rubber, coating compositions, emulsion paints, rubber dams, adhesives, binders, and especially dipped goods such as gloves, condoms, and tubing.

It should be understood that the hypoallergenic semi-synthetic latex of the present invention is an improvement over the existing art, as are the dipped films derived therefrom and the process for obtaining the hypoallergenic semi-synthetic latex. It should be appreciated that the hypoallergenic semi-synthetic latex can be used in a multitude of used wherein natural rubber has heretofore been used.

Based upon the foregoing disclosure, it should now be apparent that the hypoallergenic semi-synthetic latex, process for forming the same, and dipped films derived therefrom as described herein will carry out the objects of the invention set forth hereinabove. It is, therefore, to be understood that any obvious variations fall within the scope of the claimed invention and thus, the selection of specific natural rubber, solvents, surfactants, antioxidants, compounding ingredients and the like can be determined without departing from the spirit of the invention herein disclosed and described. Thus, the scope of the invention shall include all modifications and variations that may fall within the scope of the attached claims.

We claim:

1. A process for the preparing of a semi-synthetic hypoallergenic latex comprising the steps of
   dissolving plant material containing polyisoprene in a single phase mixed solvent system, said mixed solvent system including a hydrocarbon solvent and an organic polar solvent, to form a miscella;
   raising the concentration of organic polar solvent to a desired level, thereby causing the precipitation of the natural polyisoprene from the miscella to form a swollen-rubber mass;
   dissolving the swollen-rubber mass in a hydrocarbon solvent to form a cement;
   emulsifying the cement with an aqueous solution under the agitation and high shear; and,
   stripping the hydrocarbon solvent to form a latex dispersion.

2. A process for the formation of a semi-synthetic hypoallergenic latex, as set forth in claim 1, further comprising the step of crushing a polyisoprene containing plant prior to said step of dissolving plant material.

3. A process for the formation of a semi-synthetic hypoallergenic latex, as set forth in claim 1, wherein said step of dissolving the swollen-rubber mass in a hydrocarbon solvent to form a cement further includes adding an amphoteric surfactant to the solution.

4. A process for the formation of a semi-synthetic hypoallergenic latex, as set forth in claim 1, wherein said step of emulsifying the cement with an aqueous solution further comprises adding an anionic surfactant.

5. A process for the formation of a semi-synthetic hypoallergenic latex, as set forth in claim 1, wherein an antidegradant is added prior to said step of emulsifying.

6. A process for the formation of a semi-synthetic hypoallergenic latex, as set forth in claim 1, wherein a surfactant is formed during said step of emulsifying the cement by adding to the cement acids selected from the group consisting of fatty acids, alkylbenzenesulfonic acids and alkylnaphthalenesulfonic acids, and mixtures thereof, and a alkali metal hydroxide.

7. A hypoallergenic vulcanized dipped film comprising
   a film of a cured semi-synthetic natural rubber latex that is essentially devoid of antigens that will give rise to immune responses, wherein said film comprises less than about 2 μg of protein per gram of dry rubber, and wherein said semi-synthetic natural rubber latex is prepared by:

dissolving plant material containing polyisoprene in a single phase mixed solvent system to form a miscella, said solvent system including a hydrocarbon solvent and an organic polar solvent;

raising the concentration of organic polar solvent to a desired level, thereby causing the precipitation of the natural polyisoprene from the miscella to form a swollen-rubber mass;

dissolving the swollen-rubber mass in a hydrocarbon solvent to form a cement;

emulsifying the cement with an aqueous solution under agitation and high shear; and stripping the hydrocarbon solvent to form a latex dispersion.

8. A semi-synthetic natural rubber latex prepared by:

dissolving plant material containing polyisoprene in a single phase mixed solvent system to form a miscella, said solvent system including a hydrocarbon solvent and an organic polar solvent;

raising the concentration of organic polar solvent to a desired level, thereby causing the precipitation of the natural polyisoprene from the miscella to form a swollen-rubber mass;

dissolving the swollen-rubber mass in a hydrocarbon solvent to form a cement;

emulsifying the cement with an aqueous solution under agitation and high shear; and stripping the hydrocarbon solvent to form a latex dispersion.

9. A hypoallergenic vulcanized dipped film, as set forth in claim 7, wherein said step of dissolving the swollen-rubber mass in a hydrocarbon solvent to form a cement further includes adding an amphoteric surfactant to the solution.

10. A semi-synthetic rubber latex, as set forth in claim 8, wherein said plant material is obtained from plant life selected from the group including Hevea tree and guayule shrub.

11. A semi-synthetic rubber latex, as set forth in claim 8, wherein said latex dispersion comprises at least about 55 percent by weight dry rubber.

12. A semi-synthetic rubber latex, as set forth in claim 8, wherein said latex dispersion comprises polyisoprene globules obtained from guayule shrub having a diameter between about 0.1 and about 8 $\mu$m.

13. A semi-synthetic rubber latex, as set forth in claim 8, wherein the solids content of said latex dispersion is greater than about 60 percent by weight.

14. A semi-synthetic rubber latex, as set forth in claim 8, further comprising the step of adding antidegradants.

15. A semi-synthetic rubber latex, as set forth in claim 8, further comprising the step of adding at least one surfactant.

16. A semi-synthetic rubber latex, as set forth in claim 15, wherein said at least one surfactant is selected from the group consisting of alkali metal salts of fatty acids, alkali metal of fatty acid sulfates, alkali metal salts of alkylbenzene, alkali metal salts of alkynaphthalenesulfones, alkali metal salts of dialkylsulfosuccinates, alkali metal salts of sulfated alkylphenol ethoxylates, alkali metal salts of polyethoxyalkylphenol sulfates, alkali metal salts of polyethoxyalcohol sulfates, and mixtures thereof.

17. A semi-synthetic rubber latex, as set forth in claim 15, comprising from about 0.1 to about 20 percent by weight based on total natural rubber of said at least one surfactant.

18. A dipped film prepared from the semi-synthetic latex of claim 8.

19. A semi-synthetic rubber latex, as set forth in claim 8, wherein said latex comprises less than about 2 $\mu$g of protein per gram of dry rubber.

* * * * *